June 25, 1946.  F. T. O'GRADY  2,402,660
APPARATUS FOR PRODUCING BALANCED COLOR REPRODUCTIONS OF
OFF-BALANCE COLOR RECORDINGS
Filed Feb. 2, 1944  6 Sheets-Sheet 2

INVENTOR
Frederick T. O'Grady
BY Kenyon & Kenyon
ATTORNEYS

June 25, 1946.　　　　　F. T. O'GRADY　　　　　2,402,660
APPARATUS FOR PRODUCING BALANCED COLOR REPRODUCTIONS OF
OFF-BALANCE COLOR RECORDINGS
Filed Feb. 2, 1944　　　　　6 Sheets-Sheet 4

INVENTOR
Frederick T. O'Grady
BY Kenyon & Kenyon
ATTORNEYS

June 25, 1946.   F. T. O'GRADY   2,402,660
APPARATUS FOR PRODUCING BALANCED COLOR REPRODUCTIONS OF
OFF-BALANCE COLOR RECORDINGS
Filed Feb. 2, 1944   6 Sheets-Sheet 6

INVENTOR
Frederick T. O'Grady
BY Kenyon & Kenyon
ATTORNEYS

UNITED STATES PATENT OFFICE 2,402,660

APPARATUS FOR PRODUCING BALANCED COLOR REPRODUCTIONS OF OFF-BALANCE COLOR RECORDINGS

Frederick T. O'Grady, Flushing, N. Y.

Application February 2, 1944, Serial No. 520,772

9 Claims. (Cl. 88—24)

This invention relates to the art of color photography and more particularly to the art of making duplicate photographic prints from original negative or positive recordings in color upon a single film composed of super-imposed color sensitive photographic emulsion layers, each selectively sensitized to one of the three primary colors and which, upon development, consists of a single complete photographic color record of the object or scene photographed.

In such methods of color photography, it is often difficult to obtain balanced negative recordings of the different colors photographed. Such negative recordings are termed as being "off-balance." When off-balance of color occurs in a negative recording, the predominating color or colors are carried through to the positive print unless measures are taken in the making of the positive print to even up or balance the colors.

The film or paper ordinarily used for producing positive color prints is also composed of three color-selective photographic emulsion layers and, when printing thereon from negative color recordings, the customary procedure is to subject them to three separate exposures, first through a red color filter, then through a green color filter and finally through a blue color filter.

The reason for printing the three colors in this manner is to permit the manipulation of the respective exposures in an attempt to correct the off-balance of color existing in the original recording. Such manipulation consists of varying the time of exposure given to each color printing so that if, for instance, red should predominate in the original negative record over the green or blue recordings, then the printing time given to the red through the red filter is changed in proportion to the time of exposure given the green or blue in order that the red positive recording will balance with the green or blue recordings. Likewise, the density of two of the color recordings may be balanced to the third so that the final positive print will appear normal in color.

In present day methods, the correct exposure for each of the colors can only be determined by actual printing and developing tests. Trial exposures are made from the off-balance negative recording upon the positive film or paper which is then developed and studied for correction of balance. More often than not, innumerable printing and developing tests are made before the desired result is obtained. Obviously, such indefinite methods relying solely upon trial and error are extremely wasteful of time, labor and costly material and, what is more important, this makes them commercially impracticable. Further, it is seldom that the tests are carried through to their natural conclusion with the result that the final prints rarely approach the perfection of color which could be obtained by definite, standardized procedure.

The main object of my present invention is to provide a simple, unique and practicable means and method whereby extremely accurate balanced color in positive recordings can be made from off-balance negative recordings without loss of time, labor or material.

Another object of this invention is to provide simple and effective means for projecting and combining a plurality of colored lights to produce substantially white light through an off-balance photographic recording, and to provide means whereby during such projection the individual colored lights may be adjusted to produce a composite light that is a blend of the adjusted lights so as to secure a balanced color image of the off-balance recording.

Yet another object of the invention is to provide means for denoting the relative adjustments necessary of the individual colored lights and to provide apparatus for creating reproductions of the original recording, in which apparatus, the noted adjustments may be reproduced for individual colored lights therein so that the exposure of the recording medium to the individual colored lights of the apparatus will correspond with that shown to be necessary by the means first named.

Still another object of the invention is to provide means for producing substantially white light from a plurality of colored lights, and to provide means for adjusting the individual colored lights forming the white light to change the relative colored components thereof and to create a composite light that is a blend of the adjusted colored lights.

A further object of the invention is to provide rotatable, apertured shutter means for controlling the transmission of said colored lights, means for rotating said shutter means both continuously and intermittently and means for varying the apertures of the shutter means individually while the latter are in motion whereby the quanta of the colored lights transmitted in any given period of time may be varied individually.

A further object is to provide simple apparatus to effect the foregoing objects and others that may hereinafter appear.

To the accomplishment of the foregoing and such other objects as may hereinafter appear, this invention comprises the novel apparatus hereinafter described and then sought to be defined in the appended claims, reference being had to the accompanying drawings forming a part hereof, which show, merely for the purposes of illustrative disclosure preferred embodiments of the invention, it being expressly understood, however, that various changes may be made in practice without digressing from the inventive idea.

In the drawings, in which similar reference characters denote corresponding parts.

Figures 10, 11:
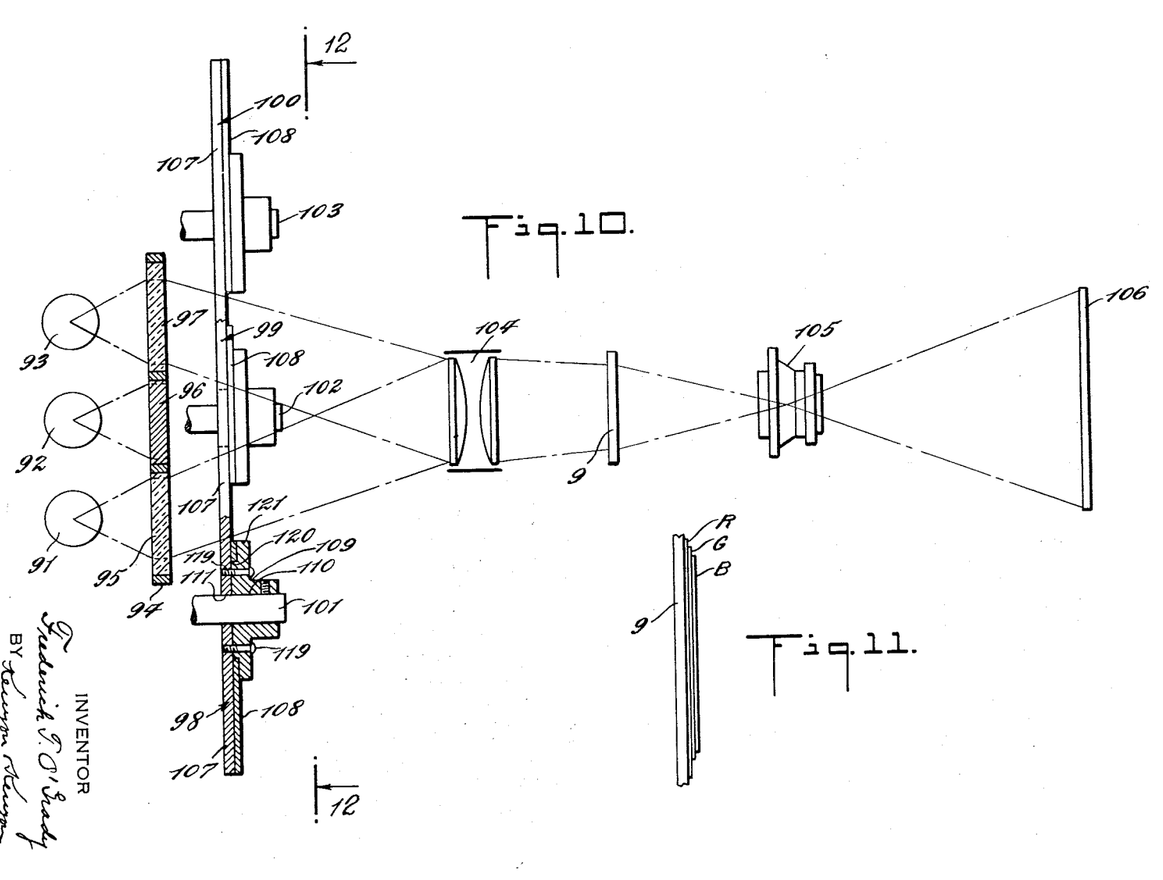
Fig. 10 is a diagrammatic showing similar to Fig. 3 of a modified form of device.
Fig. 11 is a diagrammatic illustration of multicolor color recording material.

Referring to the drawings and first to Fig. 11:

As shown in Fig. 11, a multi-layer film or paper is composed of three color-selective color-sensitive photographic emulsions combined together on a single supporting base. The red, green and blue color-sensitive emulsions are designated in Fig. 11 by the letters R, G and B respectively while their supporting base is designated by the number 9. When these multi-layer films or papers are exposed to colored objects through a camera or other photographic apparatus, the color selective quality of the sensitive emulsion layers are such that reds appearing in the scene or object photographed will be recorded only upon the red sensitive layer R, green objects will be recorded only upon the layer G and blue on the layer B. Upon development, the three emulsion layers combine to form a single complete color record of the object or scene photographed. This is a well known method of color photography and, to those skilled in the art, requires no further explanation to fully understand the object and advantages of this invention.

Such multi-layer films and paper are often inaccurate in their rendition of color and so it becomes necessary to correct this inaccuracy when making the positive prints. Since the colors red and blue are the most frequent offenders in this respect, the following explanation of my invention will be confined to disclosing means for balancing the red and blue printing exposures to the green exposure and, at the same time, showing how the correct exposures are determined without losing time in the making of actual printing and developing tests.

Figure 1:
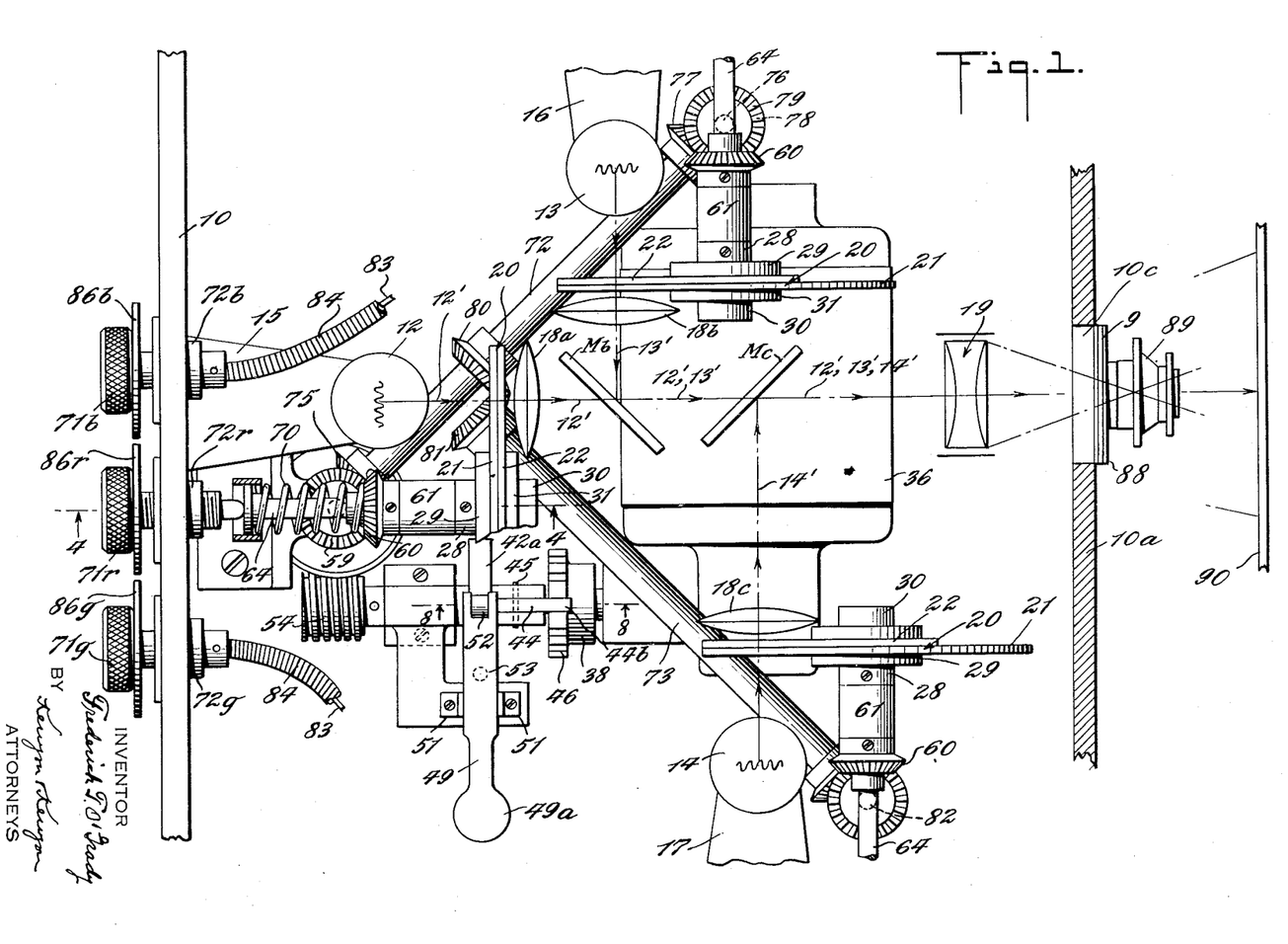
Fig. 1 is a top plan view of one form of apparatus for practicing the invention, with the enclosing casing partially removed.

Referring to Fig. 1, 10 denotes an enclosing casing shown only as a fragment but intended to enclose the entire device, and being provided with suitable ventilating openings (not shown). Three separate light sources, 12, 13, 14 are supported suitably from brackets 15, 16 and 17 so positioned and attached to the casing that the light beam 12' from source 12 will be projected forwardly from source 12, through a suitably supported collimating lens 18a to and through a suitably supported condenser lens 19, while the respective light beams 13' and 14' will be projected in opposite directions at right angles toward the beam 12'. These beams 13' and 14' are projected respectively through similar collimating lenses 18b, 18c and onto the respective mirrors Mb and Mc arranged and suitably supported at proper angles in the paths of beams 13' and 14' as to turn and direct these beams parallel with the beam 12'.

The mirrors Mb and Mc are of a known type, being of optically ground and polished glass into whose reflecting surfaces an extremely thin layer of platinum or similar material has been incorporated by a "burning in" process. Because of the fine penetration of the platinum, the platinized surface is capable both of transmitting and reflecting light.

In consequence, the beam 12' passes through both mirrors Mb and Mc to lens 19, the beam 13' is turned by the reflecting surface of mirror Mb and merges with the beam 12' beyond mirror Mb, and the combined beams 12', 13' after passing through mirror Mc, merge with beam 14' which is turned by the mirror Mc so that the beams 12', 13', 14' in combined single form reach and pass through the condenser lens 19. The light transmitted by lens 19 is a single light that is a blend of the individual colored lights. It is substantially white normally.

Rotatable shutters 20 are positioned one in front of each light source 12, 13, 14, and, preferably, between the latter and the respective lenses 18a, 18b, 18c. Since these shutters 20 are identical only one will be described. Each shutter includes a shutter disk 21 and an adjustable segment 22. The disk 21 and the segment 22 are made preferably of metal or other suitable material. The shutter disk 21 has an opening, or exposure aperture 23 extending around the axis of the shutter and defined by concentric edges 24, 25 and radial edges 26, 27. The aperture may however be a gap in the shutter. In the present instance the effective shutter area includes one hundred and ninety degrees around the axis and the opening 23 includes one hundred and seventy degrees.

The shutter disk 21 is carried on a hub member 28, and abuts an annular flange 29 provided on the hub member. A second hub member 30 having an abutment flange 31 is provided.

The adjustable segment 22 is secured to rotate with the hub member 30. Both the segment 22 and the hub member 30 (Fig. 4) are held and retained against the face of shutter 21 by means of two shouldered screws 32 which are screwed into the flange 29 of the hub member 28. Two grooves 33 are cut in the flange 31 of hub 30 to permit the adjustment of the segment 22 around the shutter axis. The shoulders of the screws 32 are slightly longer than the thickness of the flange 31 to permit free adjustment of the segment 22.

Suitable color filters 34 (Fig. 3) are provided for the shutter openings 23, a red filter 34r, for example, being provided for the shutter disk 21 in front of light source 12, a blue filter 34b for that in front of light source 13, and a green filter 34g for that in front of light source 14. The filters 34 are either fitted within the apertures or openings 23, or secured to the faces of disks 21 over the said apertures 23 as shown in Fig. 4, or may be otherwise suitably positioned. The three filters thereby provide sources of red, blue and green light.

Figure 2:
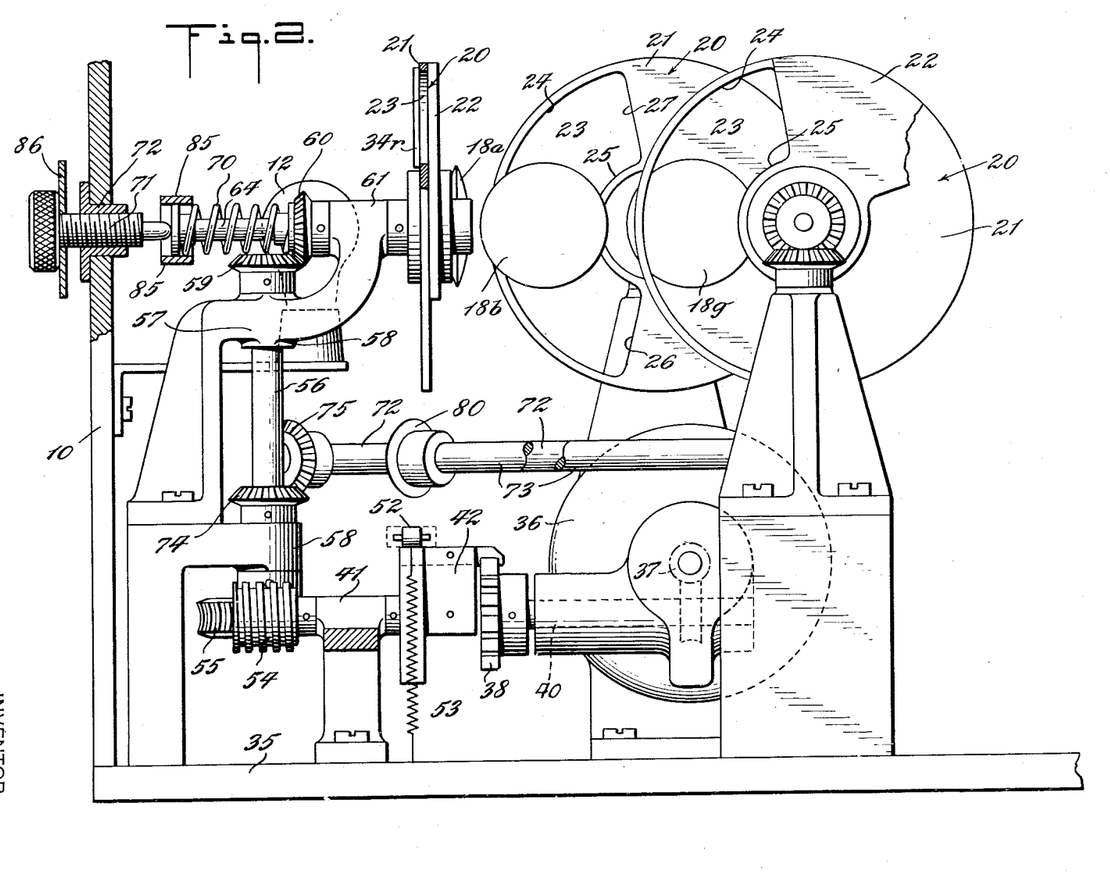
Fig. 2 is a side elevation of the device of Fig. 1.
Figure 3:
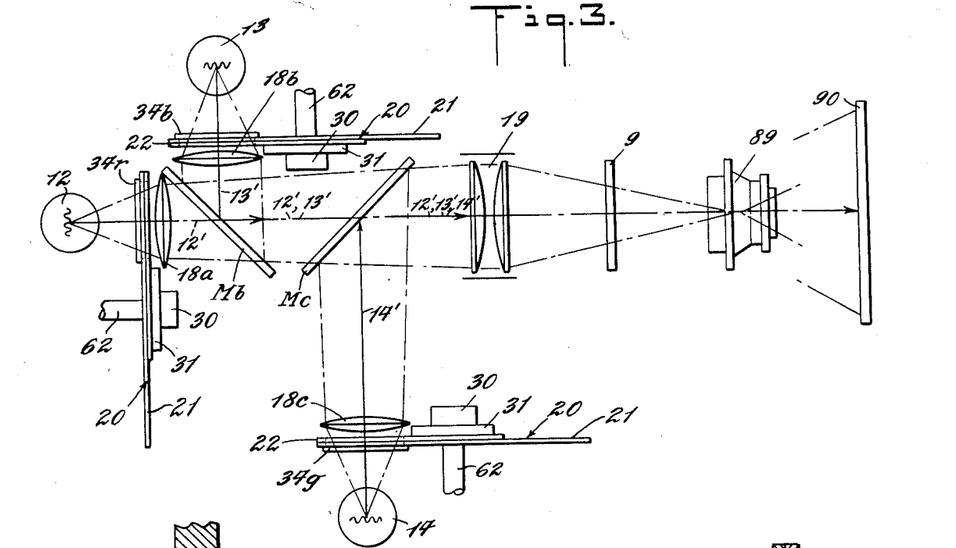
Fig. 3 is a diagrammatic view of the apparatus of Fig. 1.
Figure 4:
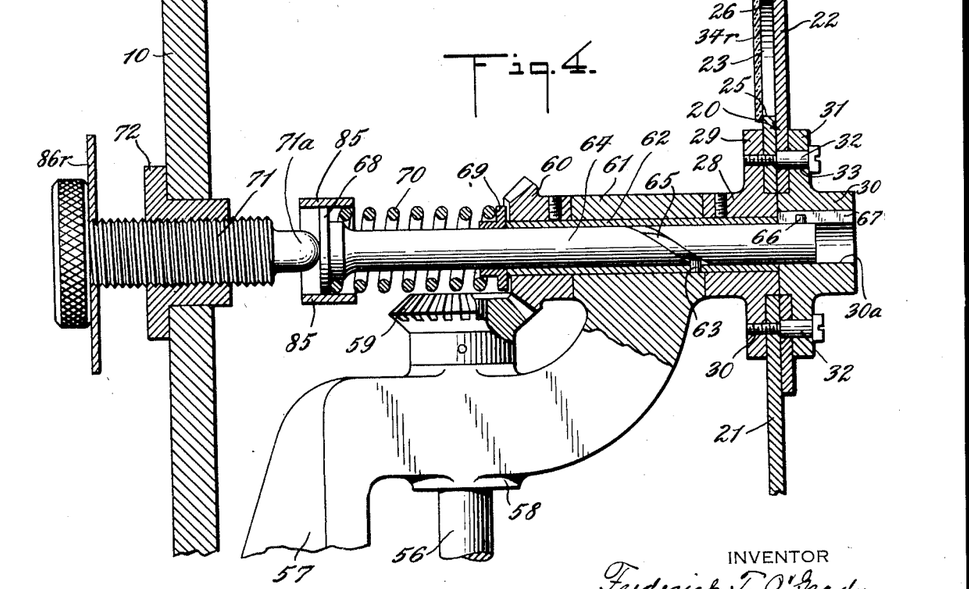
Fig. 4 is a section taken along line 4—4 of Fig. 1, illustrating details of construction of the shutter adjusting mechanism.
Figure 5:
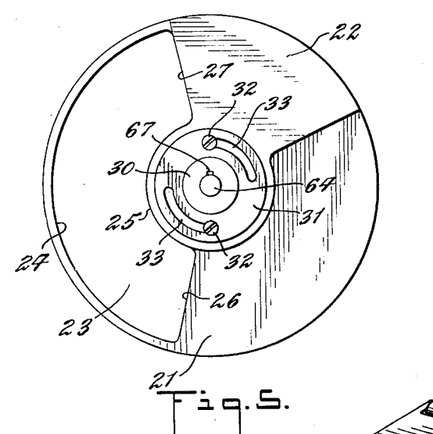
Fig. 5 is an end view taken from the right of Fig. 4, showing the shutter in one adjusted position.
Figure 6:
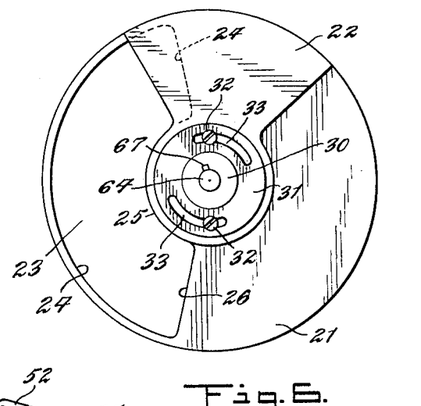
Fig. 6 is a similar view showing the shutter in a different adjusted position.
Figure 7:
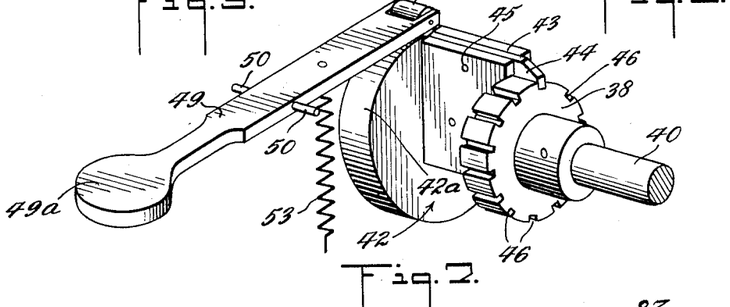
Fig. 7 is a perspective view of control mechanism to effect either continuous rotation or a single revolution of each of the light controlling discs.

The positioning of the light sources 12, 13 and 14 as shown in Figs. 1, 2 and 3 makes it possible to direct the colored lights squarely upon the condenser lens 19 without undue loss or distortion of the lights.

In order to accomplish the above result, two mirrors Mb and Mc are each placed at an angle of forty five degrees to the light sources 13 and 14 and are of such size and shape as to collect and re-direct the selective colored light rays to the condenser lens 19. These mirrors have the quality of being able to transmit and reflect light so that the red rays from its source 12 hitting the mirror Mb will pass through to the mirror Mc, through mirror Mc and on to the condenser lens 19. The double convex light collimating lens 18a which is interposed between the light source 12 and the mirror Mb converges the red light beams toward the condenser lens 19. Light rays emanating from the source 13 are intercepted by a blue color filter 34b which permits blue rays only to pass through to another collimating lens 18b which converges the blue rays onto the surface of the mirror Mb. Upon striking the surface of mirror Mb, the blue rays are turned and directed to and through mirror Mc to the condenser lens 19. As indicated, the blue light rays 13' join and blend with the red rays 12' at the moment the blue rays leave the surface of the mirror Mb. Green light rays from the source 14 are indicated in a similar manner. After passing through a green color filter 34g, they are converged by the collimating lens 18c to the surface of mirror Mc which turns and directs the green rays 14' to the condenser lens 19. Upon striking mirror Mc the green rays 14' merge with the red and blue rays 12' and 13'. Thus it will be seen that the red, green and blue colored lights, upon reaching the condenser lens 19, are merged together and pass through the condenser lens as substantially white light.

The proportioning of the colored lights to affect a balance of color in the printed image from an off-balance record on a base 9, is controlled by rotating the adjustable shutters 20. These shutters are geared to rotate in unison to cause the simultaneous passage of or shutting off of the colored lights.

Referring to the light transmitting and reflecting mirrors Mb and Mc, it is important to note that there is a substantial loss of light when such mirrors are introduced. The surface of these mirrors is such that about fifty percent of the available light is transmitted while the other fifty percent is reflected away from the mirror. In case of the red and blue lights which, by the above arrangement are affected by the action of two mirrors Mb, Mc, during their passage to the condenser lens 19, each of the colored lights 12', 13' suffers a total loss of approximately seventy five percent. The green light 14' suffers a loss of approximately fifty percent since it is affected by only one mirror Mc. To compensate for these losses and to even up the intensity of the respective colored lights to form a pure white light at the condenser lens 19 when the shutter openings 33 are fully operative, the red and blue light sources 12 and 13 are increased in intensity to approximately one hundred percent over the intensity of the green source of light 14. This compensating adjustment of the colored lights can be readily accomplished by simply using lights of approximately double intensity for illuminating the red and blue filters 34r and 34b over that used for illuminating the green filter 34g.

The three shutters 20, their individual driving mechanisms and the method employed in adjusting the shutter segments 22 during their rotation are identical in each case so that the description of one suffices for all three.

Figure 8:
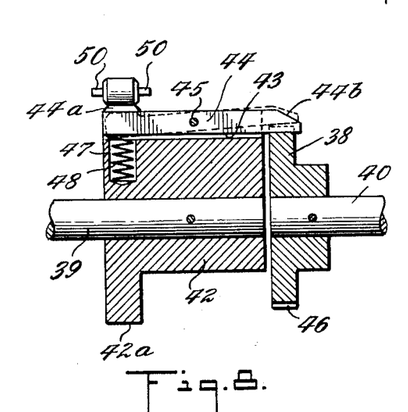
Fig. 8 is a fragmentary section on an enlarged scale taken along line 8—8 of Fig. 1.

Although not shown completely in the drawings, it is intended that the apparatus, except for suitable means for ventilation, be completely enclosed in the metal box arrangement 10 which will be supported, together with the mechanical and optical parts, on a suitable base 35. An electric motor 36 supplies the power for driving the mechanism and this motor is equipped with suitable speed reducing gears 37 for the proper functioning of a clutch 38. A horizontal shaft 39 (Fig. 8) is supported in a position coaxial with the motor driven shaft 40 by a suitably supported bearing 41 (Fig. 2). As shown in Fig. 8, a second clutch member 42 is pinned to the shaft 39 leaving a slight space for clearance between the two members 38 and 42. Across the top of member 42 within a groove 43 and extending slightly beyond the rim of member 38 is a connecting bar 44 pivoted at the point 45 approximately midway between the extreme ends of the members 38 and 42. Bar 44 is designed to enter and engage with any one of the notches or grooves 46 cut into the periphery of member 38. A hole 47 is provided in the member 42 to receive a spiral spring 48 which bears against the bar 44. Pressure from this spring causes the opposite end of the bar 44 to tilt down and enter one of the notches 46 of member 38 and hold it in this engaged position until released. In order to disengage bar 44 from the clutch member 38, a manually operated control arm 49 is provided. Arm 49 is supported by pivot pins 50 resting in suitably supported bearings 51. Roller 52 is arranged on the arm 49 and adapted to rest and ride upon the rim 42a of clutch member 42. Secured to the arm 49 and the base 35 is a spiral spring 53 which pulls the arm 49 downward holding the roller 52 against the rim 42a of member 42. The tension of spring 53 is such as to overpower the effectiveness of the spring 48 when the roller 52 bears upon the tip 44a of the catch bar 44. When the tension of spring 53 is overcome by raising arm 49, the pressure of the spring 48 operates against the bar 44, and the opposite end 44b of the bar is tilted down and in to mesh with the notched member 38 as indicated by the full lines in Fig. 8.

To keep the machine in constant motion for color inspection and adjustment purposes, the operator merely maintains downward hand pressure on the end 49a of the arm 49 for as long as it is necessary to complete the color adjustment. Constant downward hand pressure on the end 49a of arm 49 permits the bar 44 to remain engaged and rotate with the member 38. When this pressure is released, the roller 52 bears and rides upon the rim 42a of member 42 until the catch bar 44 comes around and its end 44a contacts the roller; whereupon, bar 44 is immediately tipped up and released from the driving member 38 by reason of the over-powering pressure from the roller 50. Thus the member 38 rotates member 42 a single revolution only at a time unless pressure is maintained by the operator on the end 49a of the arm 49. Continuous and intermittent rotation is thus made possible.

Pinned or keyed to the horizontal shaft 39 to rotate with the clutch member 42 is a worm 54 engaging with a worm gear 55. Worm 55 is pinned or keyed to a vertical shaft 56 which is supported by bearings 57 and 58 carried by base 35. Upon the upper end of the shaft 56 is pinned or keyed a miter gear 59 which meshes with a companion gear 60.

As an integral part of the bearing 58 and at right-angles to the shaft 56 is a bearing 61 supporting the shutter assembly 20 located in front of light source 12, its driving and adjusting means.

Referring to Fig. 4, a tubular shaft 62 is borne by the bearing 61. At one end of shaft 62 is secured the miter gear 60 and at the other end the shutter hub member 28. Approximately midway the length of shaft 62 and extending toward the axis of the shaft is a round pin 63 which is rigidly secured to travel with the shaft 62. Slidably fitted within the tubular shaft is a secondary shaft 64. A spiral-like groove 65 is machined in shaft 64 to receive the pin 63. Shaft 64 extends slightly beyond the hub member 28 to enter the bore 30a of hub member 30 to which it is slidably keyed by a pin 66 fitted to slide within the groove 67. The other end of shaft 64 extends beyond the miter gear 60 toward the rear of the apparatus and is formed with a shoulder flange 68. Adjacent gear 60 is a shoulder washer 69 which fits freely upon the shaft 64 and acts as a support for a spiral spring 70. The spring 70 is compressed to exert constant outward pressure to the shaft 64 by bearing against the flange 68. A knurled stop screw 71 is screwed into a threaded metal flange 72 fastened to the wall 10 for the purpose of adjusting the shaft 64 in the shaft 62.

Having assembled the parts as shown in Fig. 4, it is assumed that the segment 22 is set at zero leaving the shutter opening 23 fully operative.

When it is desired to reduce the shutter opening 23, the knurled screw 71 is turned in a clockwise direction. As the screw is turned, it advances further into the enclosure and forces the shaft 64 further into the tubular shaft 62. The groove 65 is then forced against the pin 63 and, due to the angle of the groove, the shaft 64 is caused to turn slightly ahead of the shaft 62. Therefore, since the shutter segment 22 is keyed to the shaft 64, segment 22 will begin to cover the shutter opening 23. Continued pressure from the screw 71 will turn segment 22 still further over the opening 23. By turning the screw 71 in a counter clockwise direction, the spring 70 will force the shaft 64 to withdraw from the shaft 62 thus reversing the direction of pressure between the groove 65 and the pin 63 causing the segment 22 to return to its inoperative position shielded behind the shutter disk 21. The length of the screw 71 and the circumferential length of the grooves 33 in the hub 30 are designed to limit the adjustment of segment 22 to approximately seventy degrees. Screw 71 is made preferably of hardened steel with its tip 71a rounded and polished to reduce to a minimum the friction between the screw 71 and the shaft 64.

Shutter assemblies 20 for the light sources 13 and 14 are assembled and rotated in the same manner as shown and described for the shutter 20 of Fig. 4 and are driven from the main shaft 56 by means of connecting shafts 72 and 73 (Fig. 1). The bearing supports for the shafts 72 and 73 are not shown.

Miter gear 74 (Fig. 2) is pinned or keyed to shaft 56 and meshes with a companion gear 75 pinned or keyed to the horizontal shaft 72. Shaft 72 extends at an angle with the vertical shaft 76 to which it is rotatably connected by miter gears 77 and 78. Gear 78 is immediately beneath a gear 79 also carried by shaft 76 and is not shown. Shaft 76 corresponds to shaft 56 in Fig. 4 and is geared to operate in the same manner.

At a position approximately midway the longitudinal connecting shaft 72 a miter gear 80 is pinned or keyed and meshes with companion gear 81 pinned or keyed to the shaft 73. Shaft 73 is directed at an angle to the shaft 72 toward the vertical shaft 82. Shaft 82 is similar to and has the same function as shaft 56 in Fig. 4 and from this shaft 82 on, the shutter and shutter driving means in front of source 14 are the same as explained for Figs. 1, 2 and 4.

All miter gears used in connecting and driving the three shutter units are identical in size, number of teeth and pitch diameter and are timed to cause the shutters 20 to rotate in synchrony with the respective shutter openings 23 timed to permit the simultaneous passage of the colored lights to the condenser lens 19.

In order that the three shutter segments 23 may be controlled from a common face of the casing 10, their threaded flanges 72 are all fastened in the common wall 10 as shown in Fig. 1. The screw 71r operates the segment 23 controlling the aperture of the shutter disk 21 associated with light source 12 directly as shown in Figs. 1 and 4. The screws 71b and 71g which similarly operate the segments 23 controlling the apertures of the shutter disks 21 associated respectively with the light sources 13 and 14, may conveniently be made to control movement of the respective sliding shafts 64 by use of flexible slide or push rods 83 carried in flexible cables 84 secured respectively to the flanges 72b and 72g and to suitable fixed guide collars 85 surrounding the flanges 68 of the respective shafts 64, so that longitudinal movement of the screws 71b and 71g is transferred correspondingly to the flanges 68 of the appropriate shafts 64. This flexible cable and rod construction 83, 84 is well known and used commonly in photography, for example, to operate shutters. Any other convenient coupling or remote control means may be substituted to produce the same result.

Figure 9:
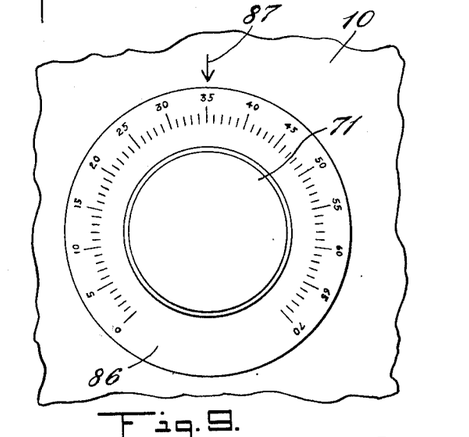
Fig. 9 is a partial end elevation taken from the left of Fig. 1.

Three vernier dial indicators 86r, 86b, 86g are attached, one to each of the knobs of the respective screws 71r, 71b, 71g. The control knobs and indicating dials are located on the outside of the enclosure 10 where they may be easily viewed. Such an indicator dial is illustrated in Fig. 9. The dial 86 is engraved with seventy divisions or calibrations to correspond with the seventy degrees of effectiveness of the shutter segment 22. A suitable reference arrow 87 is provided on the face of the wall 10 for each indicator dial 86. In the alternative, the dials may be fixed to the wall 10 and the knobs of the screws 71r, 71b, 71g provided with reference markers of suitable kind. Any other suitable construction may be used. The three dials located at a common place render it simple to adjust each shutter segment 22 during operation of the machine.

With the construction thus far disclosed, all three disks 21 rotate in synchronism, their apertures 23 being timed to permit simultaneous passage of the colored lights from the three sources to the condenser lens 19. Also, the individual segments 22 may be individually shifted during the synchronous rotation of the disks 21. Moreover, the synchronous rotation is either continuous while hand lever 49 is depressed, or limited to a single revolution at a time of each shutter disk while hand lever 49 is untouched by the operator.

The forward wall 10a of the enclosure has an aperture 10c in front of which a suitable guide frame 88 is attached together with an objective lens 89.

The multi-layer image on base 9 (Fig. 11) is inserted into the guide frame 88 and focused on a white viewing screen 90 by manipulation of the lens 89.

With the shutters in motion and lights 12, 13 and 14 lit, and after proper focusing of the image on the screen 90, the image is studied by the operator for color balance. For the purpose of illustration, it will be assumed that upon examination, the projected image shows a predominance of red and blue over the green. Therefore, the operator gradually reduces the exposure of the two colors red and blue by simply reducing the effective apertures 23 of the shutters 20 associated with the light sources 12 and 13 by manipulating knobs 71r and 71b until the projected image assumes a natural hue. When perfection in the rendition of color has been reached, the shutters are stopped and the settings of the dials 86r, 86b and 86g are noted. The light then transmitted to the lens 19 is a composite light that is a blend of the adjusted individual colored lights.

Leaving the shutter openings in their adjusted positions, the shutters are rotated to bring the shutter sections 21 in front of the colored light beams 12', 13', 14' to effectively shield the light from the screen 90. The screen 90 is then replaced by an unexposed sheet of multi-layer film or paper ready for printing thereon the colored image from member 9.

For the actual printing operation the shutters are required to make but one complete revolution. The shutters are so geared and timed to rotate together in synchrony and to stop simultaneously with the opaque portions of shutter sections 21 again shielding the colored lights from the film or paper. During this single rotation of the shutters and by reason of the adjustments of the segments 22, the exposure of each color in the off-balance image in member 9 is proportioned to render a balanced color image in the printed recording. In adjusting the segments 22 during a balance test, for example, it was found that the opening 23 of the red controlling shutter 20 was reduced by thirty degrees, the blue controlling shutter by ten degrees and the green controlling shutter by zero. Therefore, in making the actual printing exposure through these adjusted shutters, the respective exposures were also regulated so that the green received an exposure through the entire one hundred and seventy degrees of shutter opening 23g while the blue exposure received only one hundred and sixty degrees through opening 23b and the red exposure one hundred and forty degrees through opening 23r. Thus it will be seen that, although the colors red and blue predominate in the negative recording, they will be balanced to the green in the printed positive recording.

After the exposure has been made, the positive print is then developed in the usual manner.

Figure 12:
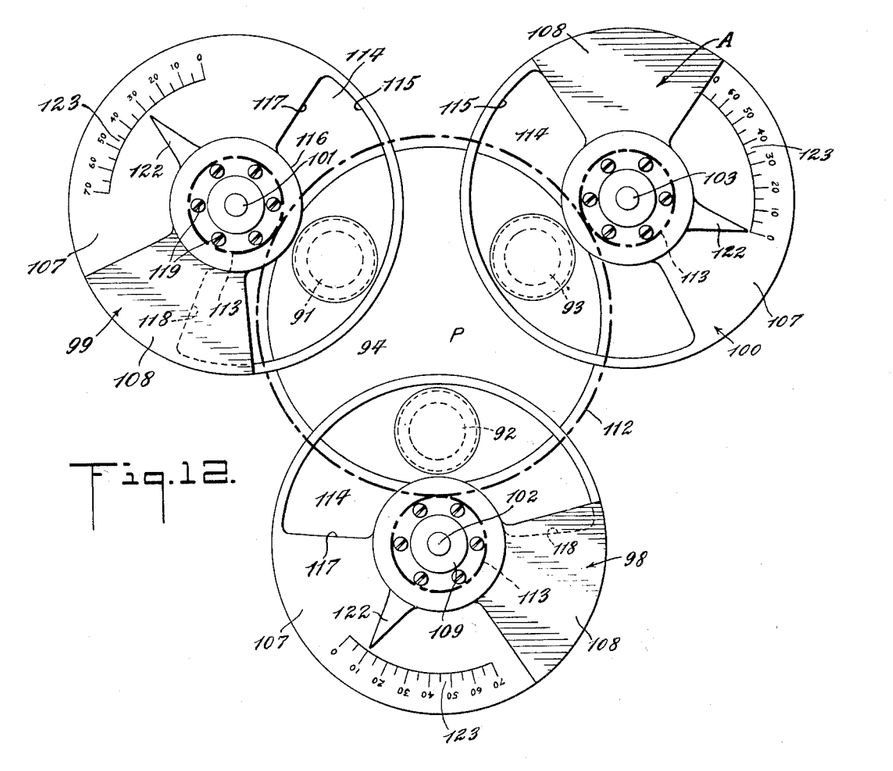
Fig. 12 is a diagrammatic face view of the system of Fig. 10 taken along line 12—12 of that figure.

A modified form of apparatus is shown more or less diagrammatically in Figs. 10 and 12.

Referring to these figures, the device suitably enclosed in a casing (not shown) comprises three separate light sources 91, 92, 93 arranged in the same plane and 120° apart about a central point P. A suitable color filter frame 94 is arranged in front of these sources and is equipped with respective red, blue and green color filters 95, 96, 97 arranged in suitable windows or openings provided in the frame 94.

Adjustable rotatable shutters 98, 99, 100 carried on driven shafts 101, 102, 103 are located one in front of each light source 91, 92, 93. A condensing lens 104 is located suitably in front of the shutters 98, 99, 100 to receive the light transmitted by the filters and pass the same through an objective lens 105 to a suitable screen 106. The color recording on a base 9 is positioned between the lenses 104 and 105 in a suitable frame (not shown). The broken lines indicate the path of the lights from their sources 91, 92, 93 to the screen 106.

Fig. 12 is a face view of the filter carrier frame 94 and the shutters 98, 99 and 100 taken on the line 12—12 in Fig. 10. The color filter carrier frame 94 is held in a fixed position suitably and supports the three filter disks 95, 96 and 97. The light sources 91, 92 and 93 are arranged immediately behind the color filter disks so that the rays of light passing through the filters will be selectively red, green and blue. The filters and the light sources are suitably spaced apart and arranged so that their rays will be directed onto the condenser lens 104. It is a well known fact that when colored lights complementary to each other are projected in superimposition upon a white surface, they combine and form white light. This phenomena is created and used in the present instance by superimposing the red, green and blue lights upon the surface of the condenser lens 104. Therefore, light rays reaching and passing through the condenser lens 104 will be white. The size and focal length of the condenser lens is such that the rays of white light are directed to cover and evenly illuminate the surface of the multi-layer color image on member 9. The image on said member is then picked up by the objective lens 105 and focused upon the viewing screen 106. The surface of the viewing screen 106 must be white or approximately so.

The structure of the rotating shutters 98, 99 and 100 are identical. Each shutter includes a shutter disc 107 and an adjustable segment 108. The disc 107 and the segment 108 are made preferably of metal or other suitable material. A hub member 109 is secured to the face of each shutter disc 107 and has a bore 110 registering with a central hole 111 to receive the respective supporting shafts 101, 102 or 103. These shafts are driven suitably from a common source indicated diagrammatically by the driving gear 112 meshing with gears 113 carried on the respective shafts.

The shutter disc 107 has an opening or exposure aperture 114 extending around the axis of the shutter and defined by the concentric edges 115, 116 and radial edges 117, 118. The aperture 114 may, however, be a gap in the shutter disc 107. In the present instance, the effective shutter area includes approximately 190 degrees around the axis and the opening 114 includes approximately 170 degrees.

The segment 108 is mounted at the forward face of the shutter disk 107 for rotative adjustment thereon about the axis of rotation of the shutter. Its mounting includes the hub member 108 secured to the forward face of the shutter by screws 119. The peripheral margin of said hub is cut away adjacent the shutter 107 to form a journal 120 and a retaining flange 121 for holding the segment 108 to the forward face of the shutter 107. Spaced apart from the segment 108 but integral thereto is formed a pointer 122 extending radially outward.

Upon the face of each of the shutters 107 a protractor scale 123 is engraved or otherwise applied and located to cooperate with the segments 108 and the pointers 122. The scales 123 are graduated from zero to seventy degrees to correspond with the circumferential length of the segments 108. With the pointer 122 in register with zero on a scale 123, the segments 108 are disposed entirely out of register with the shutter openings 114 as shown at A in Fig. 12. By turning the segment 108 in a counterclockwise direction, the opening 114 is reduced. At the same time that the segment is moved, the pointer 122 will automatically indicate the degrees of reduction in the circumferential length of the opening 114. The opening 114 may be reduced by any desired amount and in order to hold the segment 108 in its adjusted position, the pointer 122 is made to serve as a leaf spring to exert pressure upon the face of the shutter 107.

As shown in Fig. 12, these shutters are rotatably mounted in front of the filter carrier frame 94 so that the shutter openings 114 and the shutters 107 will, when rotated, pass in front of the filters 95, 96, 97 to permit the intermittent passage of the colored lights to the condenser lens 104. The three shutters are, for example, connected together by the gears 112, 113, for their rotation and are timed to rotate in synchrony to cause the simultaneous passage or shutting off of the colored lights. It will be seen that by this arrangement, each of the colored lights is independently controlled by its own shutter.

Having assembled the different parts as described, the pointers 122 are all set at zero on their respective scales to permit the full effectiveness of the openings 114 and the shutters set in motion at a predetermined speed. The light then transmitted to lens 19 is substantially white light.

With the shutters in motion, the multi-layer image on member 9 is focused upon the surface of the viewing screen 106 by means of the objective lens 105.

The focused image is then studied for color balance. For the purpose of illustration, it will be assumed that the projected image shows a predominance of red and blue over the green. Therefore, the operator gradually reduces the exposure of the two colors red and blue by simply reducing the effective apertures 114 of the shutters 107 associated with the light sources 91 and 92 until the projected image on screen 106 assumes a natural hue. When perfection in the rendition of color has been reached, the shutters are stopped from rotating and the settings of the segments 108 noted on the respective scales 123. In the present instance the settings show a reduction in the shutter openings of 30 degrees for the red exposure, ten degrees for the blue and zero for the green.

The operation for producing prints or recordings through the adjusted apertures are then identical with those of the first embodiment described and need not be re-described.

It is desirable, of course, that the shutter segments 108 be adjustable while the shutters are rotating. Therefore, the shutter constructions 20 of the first modification, their segments 22 and control means including screws 71 may be substituted for the shutters 107 and segments 108 being positioned in this case in place of the shutters 107, together with suitable necessary shafting like shafts 62 and 64 and associated parts to replace the shafts 101, 102, 103. The speed of rotation of the shutters must of course all be identical, hence the gears 113 all have a like number of teeth. The driven gear 112 may be coupled to the drive shaft of a motor (not shown) by the same type of clutch control utilized to couple shaft 40 of motor 36 of Fig. 1 to shaft 39 of that figure so that gear 112 may be rotated either continuously or intermittently a single revolution at a time in the same way as shaft 39 with corresponding rotation of shutters 107 or their substitutes.

In the above I have shown and described self-contained units capable of performing two distinct operations, namely, to adjust the printing light sources to obtain a color balance in positive prints from off-balance negative images plus the actual printing of the positive films or papers. But, for large organizations requiring many printing units to turn out large volumes of prints, the delivery of the prints can be expedited and the cost of printing apparatus considerably reduced by separating the two operations. The units described above can be used for inspection purposes only while units of modified design can be used for the actual printing of the positive images. Such a modified unit is shown in Fig. 13 and designed to be attached to ordinary photographic printing enlargers and used in conjunction with the units of Figs. 1 to 12.

Figure 13:
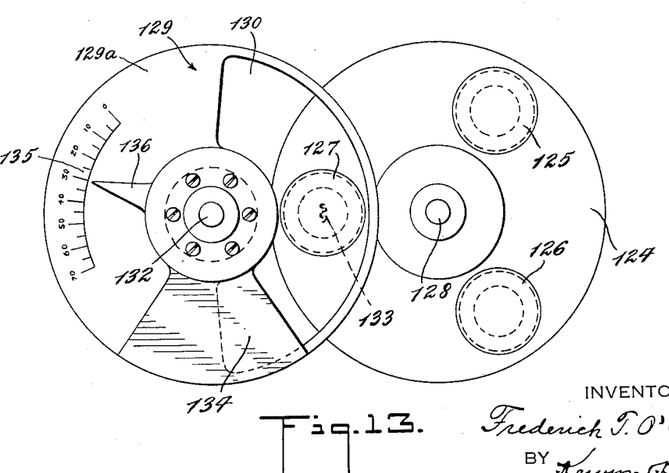
Fig. 13 is a diagrammatic face view of a device used exclusively for reproducing balanced color photographic images in accordance with the invention.

Referring to Fig. 13, 124, is a filter carried frame similar to the filter frame 94 and also contains three red, green and blue color filters 125, 126 and 127 respectively. Unlike frame 94 however, frame 124 is supported upon a shaft 128 to permit it to be rotated. Overlapping one side of the filter frame 124 is a single rotatable shutter assembly 129 identical in design to the shutters 107, 108 in Figs. 10 and 12 is mounted so that the shutter opening 130 and shutter section 129a will pass successively in front of each of the color filters 125, 126, 127 when the shutter 129 is rotated upon a supporting shaft 132.

Ordinary printing apparatus is fundamentally similar to the apparatus shown in Figs. 1 and 10, in that embodied in such apparatus is a condenser lens, supporting means for the image to be printed, an objective lens plus a machine base which acts as supporting means for the positive film or paper (not shown). It differs, however, in that only one light source is employed. Therefore, the unit of Fig. 13 is designed to be mounted upon such printing apparatus in such a way as to bring each of the color filters 125, 126 and 127 selectively within the path of the single printing light 133. Likewise, the shutter unit 129 is mounted so that the light from the source 133 will pass through the shutter opening 130 but be shut off during passage of the shutter section 129a.

It will be noted that the shutter 129 is equipped with an adjustable segment 134 identical with and in identically the same way as the shutters 107 which, also, cooperates with a protractor scale 135 and a pointer 136. The segment 134 is capable of adjustment in the same manner as segments 108 and its position of adjustment is indicated by the protractor scale 135 and pointer 136.

At this point, it might well be noted that in present day methods of making color prints upon multi-layer films or paper, the films or paper are subjected to three separate and successive exposures through the three color filters. The density of the selective exposures are individually controlled by the lens diaphragm (not shown) in an effort to bring about a color balanced print.

In the present embodiment of Fig. 13, however, the exposures are governed by the adjustable rotating shutter 129 and the time of exposure to be given each color printing has been definitely established by the open area 130 left uncovered by the segment 134. Thus, the making of the color print now becomes a straight-forward procedure.

Having definitely established the exposures necessary to produce a balanced color print from the off-balance color negative or base 9 in the apparatus of Figs. 1–9 or 10 and 12, the negative is removed from the units of these figures and placed in the printing unit employing the unit shown in Fig. 13. At the same time, the settings of the dials 86 or scales 123 are carefully noted. The filter carrier frame 124 is then adjusted to bring the red filter 127 as shown in Fig. 13 within the path of the printing light 133 and the shutter 129 rotated to bring the shutter section 129a in front of the printing light. The shutter segment 134 is then set with the pointer at thirty degrees thus reducing the shutter opening 130 from one hundred and seventy degrees to one hundred and forty degrees. With the printing light 133 turned on, the shutter is given one complete revolution—starting and stopping with the shutter section 129a directly in front of the printing light 133. Having made the red exposure through the red filter upon the positive film or paper, disk 124 is given one-third of a turn in a direction to bring the green filter 126 in front of the light 133. Segment 134 is then adjusted to zero to correspond with the balance notes which showed that the green requires no reduction in exposure. Shutter 129 is then given another single complete revolution thus making an exposure of the green negative record upon the positive film or paper. The same procedure is followed in the printing of the blue record. The filter frame 124 is turned to bring the blue filter 125 into operative position, segment 134 is set at ten degrees, the shutter 129 rotated one complete revolution and the blue exposure made. Having thus completed the three exposures, the positive print is then ready for development in the usual manner.

It will be seen, with all the units described, since the speeds of the shutter discs are maintained at equal values, that the effect of variation of individual of the colored lights by adjustment of the respective shutter segments is a variation in quanta of the individual colored lights projected in any given period of time to the screens or light sensitive emulsion. In other words, a variation in the period of transmission of any particular colored light in a given period of time is made available and utilized to secure balanced reproduction of off-balance recordings. Put in still another way, the light transmitting areas of the individual apertures of the various shutters are variable individually to permit adjustment of the quanta of the individual colored lights transmitted in any given period of time.

When using this method of testing and printing upon separate units, it is extremely important that the quality of light used in the various units described correspond with each other. If the lights do not correspond, the finished positive print will be off-balance. The print will also be thrown off-balance if the speed of rotation of the printing shutter 129 does not correspond with the speed of rotation of the testing shutters 21 or 107. The shutter 129 is driven by any suitable means (not shown) coupled to its shaft 132 by a clutch similar to that used in the device of Fig. 2 between its shafts 39 and 40.

Although for the purpose of simplicity I have shown and described my method of balancing in conjunction with multi-layer films and papers for "still" pictures, I wish it to be understood that I do not confine myself to this one particular use. The process is equally adaptable to other methods of producing still pictures in color as well as to producing "motion" pictures in color. It must be also understood that I do not confine myself to the particular mechanical and optical arrangements shown and described but claim the right to make such changes as lie within the scope of the claims.

What I claim is:

1. Apparatus for the purpose of producing balanced color in photographic printed recordings comprising sources of white light, a plurality of color filters in front of said sources, rotating shutters in front of said filters having adjustable apertures to permit reduction in exposure of certain colors while maintaining the full exposure of other colors, a tubular shaft for each shutter, a member movable longitudinally within each tubular shaft, means for coupling each shutter to its tubular shaft to rotate with the latter when such shafts are driven, means to drive said shafts, a helical groove and cam follower coupling between each shaft and the member movable slidably within it to effect rotary movement of each such member whenever longitudinal displacement is effected, an aperture covering member coupled to each such movable member so that rotation of any such movable member imparts corresponding rotation to the corresponding aperture covering member for adjusting the apertures while the shutters are rotating and means for rotating the shutters.

2. Apparatus for correcting off-balance photographic color recordings comprising sources of white light, a plurality of color filters in front of said sources, rotating shutters in front of said filters having adjustable apertures to permit reduction in exposure of certain colors while maintaining the full exposure of other colors, means for adjusting said apertures while said shutters are in motion, a motor, a drive shaft driven by said motor, a member driven by said shaft and provided with peripheral notches, a second shaft arranged coaxially with the first shaft, a member driven by said second shaft, an arm pivotally supported on said second named member and engageable in any of the said notches, spring means normally maintaining such engagement to couple said two shafts, means for periodically disengaging said arm from said notches to uncouple said two shafts, and means coupling said second shaft to said shutters for rotating the latter.

3. Apparatus for correcting off-balance photographic color recordings comprising sources of white light, a plurality of color filters in front of said sources, rotating shutters in front of said filters having adjustable apertures to permit reduction in exposure of certain colors while maintaining the full exposure of other colors, a motor, a drive shaft driven by said motor, a member driven by said shaft and provided with peripheral notches extending axially of the shaft, a second shaft arranged coaxially with the first shaft, a member driven by said second shaft, an arm extending axially of said second shaft and pivotally supported on said second-named member and engageable in any of said notches, spring means normally urging said arm into such engagement, a second pivotally supported arm member, means urging a portion thereof into engagement with the peripheral surface of said second-named member, and roller means on said portion for periodically engaging a portion of said first-named arm to disengage it from the notches, means to lift said roller means clear of the second-named member to render said roller means ineffective, and means coupling said second shaft to said shutters for rotating the latter either intermittently or continuously.

4. Apparatus for correcting off-balance photographic color recordings comprising sources of white light arranged to project beams at right angles to each other, means for resolving the white lights of these sources into individual complementary colored lights, means for collecting and combining the complementary lights to form a composite light, rotatable shutters one arranged in front of each white light source and each having an adjustable aperture to permit reduction in transmission of any desired ones of the colored lights while permitting full transmission of others of the colored lights, driving means for rotating all shutters simultaneously at synchronous speed, a motor, a shaft driven by said motor, a member driven by said shaft and provided with peripheral notches, a second shaft, a member driven by said second shaft, an arm pivotally supported on said second member and engageable in any of said notches, means normally maintaining such engagement, means for periodically disengaging said arm from the notches to uncouple the shafts, means coupling the second shaft to said driving means, means for varying the aperture of each apertured shutter individually whereby the quantum of each colored light in the composite light may be varied individually, means for projecting an off balance recording with said composite light, and means to receive the projection whereby the latter may be observed and balanced as to color by varying respective of the apertures.

5. Apparatus for correcting off-balance photographic color recordings comprising sources of white light arranged to project beams at right angles to each other, mans for resolving the white lights of these sources into individual complementary colored lights, means for collecting and combining the complementary lights to form a composite light, rotatable shutters one arranged in front of each white light source and each having an adjustable aperture to permit reduction in transmission of any desired ones of the colored lights while permitting full transmission of others of the colored lights, driving means for rotating all shutters simultaneously at synchronous speed, a motor, a shaft driven by said motor, a member driven by said shaft and provided with peripheral notches, a second shaft, a member driven by said second shaft, an arm pivotally supported on said second member and engageable in any of said notches, means normally maintaining such engagement, means for periodically disengaging said arm from the notches to uncouple the shafts, means coupling the second shaft to said driving means, means for varying the aperture of each apertured shutter individually whereby the quantum of each colored light in the composite light may be varied individually, means for projecting an off balance recording with said composite light, means to receive the projection whereby the latter may be observed and balanced as to color by varying respective of the apertures and means to expose color sensitized means to the projection for a predetermined time after the projection has been balanced as to color.

6. Apparatus for correcting off-balance photographic color recordings comprising sources of white light arranged to project beams at right angles to each other, means for resolving the white lights of these sources into individual complementary colored lights, means for collecting and combining the complementary lights to form a composite light, rotatable shutters one arranged in front of each white light source and each having an adjustable aperture to permit reduction in transmission of any desired ones of the colored lights while permitting full transmission of others of the colored lights, driving means for rotating all shutters simultaneously at synchronous speed, a motor, a shaft driven by said motor, a member driven by said shaft and provided with peripheral notches, a second shaft, a member driven by said second shaft, an arm pivotally supported on said second member and engageable in any of said notches, means normally maintaining such engagement, means for periodically disengaging said arm from the notches to uncouple the shafts, means coupling the second shaft to said driving means, means for varying the aperture of each apertured shutter individually whereby the quantum of each colored light in the composite light may be varied individually, means for projecting an off-balance recording with said composite light, means to receive the projection whereby the latter may be observed and balanced as to color by varying respective of the apertures, color sensitized means, and means to expose the latter to colored lights corresponding in number, kind and quanta to those forming the balanced projection on said receiving means.

7. Apparatus for correcting off-balance photographic color recordings comprising sources of white light, means for resolving the white lights of these sources into individual complementary colored lights, means for collecting and combining the complementary lights to form a composite light, rotatable shutters one arranged in front of each white light source and each having an adjustable aperture to permit reduction in transmission of any desired ones of the colored lights while permitting full transmission of others of the colored lights, driving means for rotating all shutters simultaneously at synchronous speed, a motor, a shaft driven by said motor, a member driven by said shaft and provided with peripheral notches, a second shaft, a member driven by said second shaft, an arm pivotally supported on said second member and engageable in any of said notches, means normally maintaining such engagement, means for periodically disengaging said arm from the notches to uncouple the shafts, means coupling the second shaft to said driving means, means for varying the aperture of each apertured shutter individually whereby the quantum of each colored light in the composite light may be varied individually, means for projecting an off-balance recording with said composite light and means to receive the projection whereby the latter may be observed and balanced as to color by varying respective of the apertures.

8. Apparatus for correcting off-balance photographic color recordings comprising sources of white light, means for resolving the white lights of these sources into individual complementary colored lights, means for collecting and combining the complementary lights to form a composite light, rotatable shutters one arranged in front of each white light source and each having an adjustable aperture to permit reduction in transmission of any desired ones of the colored lights while permitting full transmission of others of the colored lights, a tubular shaft for each shutter, a member movable longitudinally within each tubular shaft, means coupling each shutter to its tubular shaft to rotate with the latter when such shafts are driven, means to drive said shafts, a helical groove and cam follower coupling between each shaft and its contained movable member to effect rotary movement of the latter whenever longitudinal displacement thereof is effected, aperture covering members, one coupled to each such movable member so that rotation of any such movable member rotates its coupled covering member correspondingly, means for longitudinally displacing the movable members individually for varying the aperture of each apertured shutter individually whereby the quantum of each colored light in the composite light may be varied individually, means for projecting an off-balance recording with said composite light, and means to receive the projection whereby the latter may be observed and balanced as to color by varying respective of the apertures.

9. Apparatus for correcting off-balance photographic color recordings comprising sources of white light, means for resolving the white lights of these sources into individual complementary colored lights, means for collecting and combining the complementary lights to form a composite light, rotatable shutters one arranged in front of each white light source and each having an adjustable aperture to permit reduction in transmission of any desired ones of the colored lights while permitting full transmission of others of the colored lights, a tubular shaft for each shutter, a member movable longitudinally within each tubular shaft, means coupling each shutter to its tubular shaft to rotate with the latter when such shafts are driven, means to drive said shafts, a helical groove and cam follower coupling between each shaft and its contained movable member to effect rotary movement of the latter whenever longitudinal displacement thereof is effected, aperture covering members, one coupled to each such movable member so that rotation of any such movable member rotates its coupled covering member correspondingly, means for longitudinally displacing the movable members individually for varying the aperture of each apertured shutter individually whereby the quantum of each colored light in the composite light may be varied individually, means for projecting an off balance recording with said composite light, means to receive the projection whereby the latter may be observed and balanced as to color by varying respective of the apertures and means to expose color sensitized means to the projection after the projection has been balanced as to color.

FREDERICK T. O'GRADY.